United States Patent
Girsh

[11] Patent Number: 5,912,040
[45] Date of Patent: Jun. 15, 1999

[54] PROCESS OF MAKING A DAIRY PERMEATE-BASED BEVERAGE

[75] Inventor: Leonard S. Girsh, South Palm Beach, Fla.

[73] Assignee: Immunopath Profile, Inc., Huntingdon Valley, Pa.

[21] Appl. No.: 08/591,464

[22] PCT Filed: Aug. 2, 1994

[86] PCT No.: PCT/US94/08795

§ 371 Date: Feb. 2, 1996

§ 102(e) Date: Feb. 2, 1996

[87] PCT Pub. No.: WO95/03706

PCT Pub. Date: Feb. 9, 1995

Related U.S. Application Data

[63] Continuation of application No. 08/100,902, Aug. 3, 1993, abandoned.

[51] Int. Cl.$^6$ ............................ A23C 17/00; A23C 21/00; A23C 9/12; B01D 61/00

[52] U.S. Cl. .............................. 426/583; 426/41; 426/42; 426/43; 426/804; 210/650

[58] Field of Search ................. 426/41, 42, 43, 426/583, 491, 804; 210/650

[56] References Cited

U.S. PATENT DOCUMENTS

| | | | |
|---|---|---|---|
| Re. 27,806 | 10/1973 | Dienst et al. | 260/112 |
| 3,923,847 | 12/1975 | Roselius et al. | 260/412.8 |
| 3,930,039 | 12/1975 | Kuipers | 426/271 |
| 4,001,198 | 1/1977 | Thomas | 260/112 |
| 4,078,093 | 3/1978 | Girsh | 426/660 |
| 4,138,501 | 2/1979 | Chaveron et al. | 426/239 |
| 4,202,909 | 5/1980 | Pederson, Jr. | 426/239 |
| 4,309,417 | 1/1982 | Staples | 424/128 |
| 4,409,247 | 10/1983 | Baret et al. | 426/41 |
| 4,497,833 | 2/1985 | Anderson | 426/41 |
| 4,622,300 | 11/1986 | Ottofrickenstein et al. | 426/41 |
| 4,704,292 | 11/1987 | Kattenberg | 426/565 |
| 4,954,361 | 9/1990 | Girsh | 426/580 |
| 5,064,674 | 11/1991 | Girsh | 426/580 |
| 5,112,636 | 5/1992 | Girsh | 426/581 |
| 5,186,971 | 2/1993 | Girsh | 426/580 |
| 5,204,134 | 4/1993 | Girsh | 426/580 |
| 5,366,754 | 11/1994 | Rudan et al. | 426/633 |

FOREIGN PATENT DOCUMENTS 0 364 053  4/1990  European Pat. Off. .

OTHER PUBLICATIONS

The Condensed Chemicals edited by Gessner Hawley, P. 405, Sep. 1986.
Fundamental of diary chemistry, p. 742, 1988.
Condensed Chemical Dictionary, p. 696, 1981.
Geilman et al., Production of an Electrolyte Beverage from Milk Permeate *Daily Science* 75:2364–2369 (1992).

*Primary Examiner*—Peter Chin
*Assistant Examiner*—Jacqueline A. Ruller
*Attorney, Agent, or Firm*—Seidel, Coonda, Lavorgna and Monaco, PC

[57] ABSTRACT

Dairy permeate, the liquid component of milk or whey which remains after filtration recovery of proteins, is rich in vitamins and minerals. The permeate is collected, immediately processed to arrest the activity of cheese-making bacteria. One or more flavoring agents are added to whey permeate form an electrolyte beverage useful as a sports drink or as a therapeutic to replace electrolyte loss. The beverage is extremely low in milk protein, and may be used by individuals having mild to moderate milk protein allergy. Such individuals comprise the vast majority of the milk-allergic population. Hypoallergenic protein and optional fat is added to milk or whey permeate to form a substantially hypoallergenic milk product.

23 Claims, No Drawings

PROCESS OF MAKING A DAIRY PERMEATE-BASED BEVERAGE

This is a continuation of application Ser. No. 08/100,902, filed Aug. 3, 1993, now abandoned.

FIELD OF THE INVENTION

The invention relates to beverages and confections made from dairy permeates.

BACKGROUND OF THE INVENTION

Whey is a by-product of cheese manufacture. Whey comprises the serum or watery part of milk that is separated from the coagulable part or curd in the process of cheese making. Whey is rich in lactose, minerals, vitamins and protein (lactalbumin).

Cheese manufacturers have attempted to utilize whey as a source of protein. Thus, whey is subjected to filtration to capture the protein component. The retentate of this filtration, known as whey protein concentrate, has some commercial utility as a relatively inexpensive source of milk protein. It is used as an animal feed. A cheese-making installation producing 20,000 pounds of cheese per day will also produce 180,000 pounds of whey. The whey is typically diluted 20% or more with water prior to filtration. From this amount of whey, roughly 2,700 pounds of whey protein concentrate is obtained. The balance of the whey material, constituting the permeate from the whey filtration, may be used as a source of lactose. More typically, it is discarded, even though it is a rich source of vitamins and minerals.

U.S. Pat. No. 5,064,674, describes the production of a hypoallergenic milk product from a whey permeate obtained by passing casein-free sweet whey through an ultrafiltration membrane having a 10 kDa cut off, that is, the filter excluded molecules having a size greater than 10 kDa. Other hypoallergenic milk products are prepared from a milk permeate, generated by filtering milk through an ultrafiltration membrane having a 5 kDa cut-off. The milk or whey permeate is effectively deproteinized and defatted by the ultrafiltration treatment. The permeate is supplemented with hypoallergenic protein, fat, vitamins, minerals and favorings to form an essentially hypoallergenic milk product.

Other hypoallergenic milk products are disclosed in U.S. Pat. No. 4,954,361.

Geilman et al., *J. Dairy Sci.* 75, 2364–2369 (1992), discloses the preparation of an electrolyte beverage from milk permeate. Whole milk was filtered through a 20 kDa exclusion membrane. The permeate was hydrolyzed with lactase and then acidified to pH 3.5–3.8 with citric acid. No adjustment was made to reduce the concentration of potassium. Sucrose was furthered added as a sweetener. However, Geilman et al. do not suggest forming an electrolyte drink from whey permeate.

U.S. Pat. No. 4,078,093 describes a hypoallergenic chocolate prepared by treating cocoa powder so as to denature substantially all of the protein allergens which cause chocolate allergies. Denaturation is achieved by a prolonged two-step heat treatment. In a first step, cocoa powder is prepared by heating the ground nibs of roasted cocoa beans at 215–300° F. at 5500–8000 lb./in$^3$ for 15–90 minutes. In the second step, the cocoa powder prepared in the first step, is combined with cocoa butter and sugar and further heat-treated at 180–190° F. for 48–96 hours.

SUMMARY OF THE INVENTION

It is an object of the invention to provide novel uses for whey permeate, which has heretofore been regarded as an unusable waste by-product of cheeses manufacturing.

It is an object of the invention to provide an electrolyte beverage based upon whey permeate, useful as a sports drink or as a therapeutic aid in the replacement of electrolytes lost through vomiting or diarrhoea.

It is an object of the invention to provide a process for the preparation of whey-based electrolyte beverages.

It is an object of the invention to provide substantially hypoallergenic milk products from dairy permeates, which have enhanced flavor and palatability.

These and other objects of the invention will be apparent from the following description.

An electrolyte beverage is provided comprising a pasteurized whey permeate and one or more flavoring agents. The whey permeate component preferably has a milk protein content of not more than about 0.25 wt. %, more preferably not more than about 0.1 wt. %, most preferably not more than about 0.025 wt. %.

A process for preparing an electrolyte beverage is also provided. Whey is filtered to form a whey permeate. The whey permeate is collected and treated to arrest microbial activity in the permeate. The treatment occurs promptly before significant microbe-induced degradation has occurred in the permeate. The permeate is then flavored with one or more flavoring agents. Preferably, the step of filtration is through a filter having a molecular size exclusion of at least as low as about 20 kDa, more preferably at least as low as about 10 kDa. The protein content of the permeate is preferably no more than about 0.25 wt. %, more preferably no more than about 0.1 wt. %, most preferably no more than about 0.025 wt. %.

A process for preparing a substantially hypoallergenic milk product is provided. Milk or whey is filtered to form a dairy permeate containing no more than about 0.5 wt % milk protein. The permeate is collected and treated to arrest microbial activity in the permeate. The treatment occurs promptly before significant microbe-induced degradation has occurred in the permeate. A hypoallergenic component is then added, and optional hypoallergenic fat.

By "dairy permeate" is meant a liquid portion of milk or whey which is collected upon passage of milk or whey, or liquid fraction of milk or whey, through a filter having a molecular size exclusion sufficient to filter out at least about 99.5 wt % of milk proteins, such that the permeate is rendered substantially hypoallergenic. Preferably, the dairy permeate results milk or whey using a filter having a molecular size exclusion of at least as small as about 20 kDa.

"Milk permeate" means a dairy permeate from filtration of milk. "Whey permeate" means a dairy product from filtration of whey.

By "milk" is meant not only whole milk, but also skim milk or any liquid component thereof. By "whey" is meant the milk component remaining after all or a substantial portion of the fat and casein contained are removed.

All percentages expressed herein are weight percentages (wt. %), unless indicated otherwise.

DETAILED DESCRIPTION OF THE INVENTION

Cheeses are made by adding the enzyme rennin (rennet extract), or a combination of rennin and acid (usually lactic acid produced by starter cultures), to coagulate milk. The curds are separated from the whey and processed into cheese. All cheeses require a period of time for ripening. Ripening is brought about by microbial agents including bacteria, molds and/or yeasts. The same microbes are present in the whey. Their action can continue the cheese making process in whey, even though the curd has been removed.

Following removal of curd, whey is filtered to remove protein. The permeate, while being substantially free of protein, is an inexpensive source of minerals and vitamins, particularly those minerals which are found in modern electrolyte beverages used for the replacement of electrolytes. The present invention provides for the effective commercial utilization of whey permeate, which would otherwise be discarded by cheese manufacturers, or sold for a few cents per pound.

Dairy permeate is obtained upon crude filtration of milk or whey, that is, filtration using a dairy filter or membrane having a molecular weight size exclusion of approximately 20 kDa or lower. Whey may be diluted at least about 20% with water during the cheese making process, prior to filtration. If the filtration process is running properly, the permeate will have a protein content of as low as about 0.025%, based upon the weight of the permeate. Inefficient filtration, such as through a worn filter membrane, may increase the protein concentration by an order of magnitude, i.e., to about 0.25 wt. %. The protein concentration may be maintained at 0.025 wt. % by frequent servicing or replacement of the filter membrane/filter. Moreover, the protein content of the permeate can be minimized by selecting a filter/membrane with a smaller size exclusion, e.g. a 10 kDA filter.

A typical filter element useful in generating permeate from whey or milk comprises a polyethersulfone spiral membrane (Deaal Ultrafilter ER 3840C) having an average selectivity of $0.01\mu$ (nominal), a typical operating range of 20–145 psi, and a maximum pressure drop per membrane element of 60–65 psi. The usual ideal daily range of pressure is 20 psi back pressure and 80–85 psi feed pressure.

The filter should be suitably "primed" prior to use. This is accomplished by allowing whey (or milk) to pass through the filter for at least about 15 minutes before collecting any of the permeate. The pre-15-minute permeate should be discarded as it may contain proteins large enough to be considered allergenic. For a whey permeate, the completion of the priming period is signalled by establishment of a permeate flow equal to about 84% by volume of the whey volume before filtration. Successful priming is also indicated by establishment of a permeate flow which has only minimal cloudiness, compared to the unfiltered whey.

Regardless of the efficiency of the filtration, the permeate should not have a milk protein content of more than about 0.25 wt. %, preferably no more than about 0.1 wt. %. A properly functioning dairy filter of the type described above will produce a permeate having only 0.025% protein. Milk contains about 3.25% protein. Thus, the permeate contains only about 0.71% of the protein of milk.

Maintaining a very low protein concentration in the dairy permeate, and therefore in the beverage based thereon, is important to minimizing the allergenicity or the product. Electrolyte beverages are typically entirely protein-free, since they generally comprise nothing more than synthetic mixtures of mineral salts to which flavoring has been added. Thus, the consuming public has come to expect that electrolyte beverages are hypoallergenic. Where, as in the present invention, a good-tasting electrolyte beverage is derived from milk protein-containing raw materials, care must be taken to reduce the allergenicity of the product to an acceptable level, consistent with the expectation that an electrolyte beverage will not contain allergens. Whey permeate, while not being perfectly hypoallergenic, contains such little protein that its consumption by the majority of milk protein-allergic individuals will be tolerated. Veterinary chemicals and medications used in dairy husbandry generally bind protein. Thus, the elimination of protein from the whey permeate will also remove such chemicals and medications.

It has been found that to maintain palatability, the dairy permeate should be treated quickly after it is generated. Whey permeate, in particular, is much more susceptible to bacterial contamination than milk. The same bacteria responsible for fermenting milk curd into cheese is also present in whey, and hence the whey permeate. Should those bacteria be permitted to act on the whey permeate to a substantial degree, the permeate, and hence the beverages formed therefrom, will possess a "cheesy" off-taste. Thus, the permeate should be treated as soon as possible after its generation to arrest the activity of the cheese-making microbes therein. Treatment should occur before significant microbe-induced degradation of the permeate has taken place. The common cheesy odor of whey products is thereby eliminated.

The most common change in milk products resulting from the growth of microorganisms is the development of acid. The action of cheese-making bacteria on the dairy permeate, and whey permeate in particular, may be monitored as a drop in the pH of the permeate. The pH of the dairy permeate, which is typically about 6.2–6.4 (6.3 being the most usual value) immediately after the permeate is collected, will decline to about 6.2, and possibly lower, such as to 5.9, if the cheese-making bacteria remain unchecked. Thus, the dairy permeate should be treated before the pH of the permeate falls off significantly from 6.3. It has been observed that prompt treatment delays the onset of deterioration of the pH, titratable acidity, taste and smell by 3 or more hours at room temperature. Preferably, the permeate is treated to arrest the cheese-making microbes much before the pH of the permeate falls more than about 0.3 pH unit from the initial pH value at the time of collection. A fall in pH of this magnitude is associated with departure from a fresh milk-like taste. It has been found that a significant increase in microbial growth (about two-fold) will occur about 2 hours following permeate collection, at about room temperature. At about one hour there is no significant change in microbial growth. The least growth is seen at about 15 minutes post collection. Thus, it is preferred that the permeate is treated to arrest microbial growth within about 2 hours of the permeate's collection, more preferably within about 1 hour, most preferably within about 15 minutes. The permeate should be treated even sooner if the dairy plant is not located in a cool climate, or is not air conditioned. Thus, where possible, the permeate is treated immediately upon collection. Where the permeate is refrigerated after collection, the interval may be longer, as refrigeration will retard the action of the cheese-making microbes and preserve the flavor of the whey permeate for some time. If a dry powder is the goal, then immediate drying enhances the efficiency of energy utilized.

The treatment to arrest microbial activity is preferably coupled with permeate production in a continuous process. Accordingly, the permeate is continuously collected. The continuously collected permeate is continuously treated to arrest microbial activity. In this manner, the permeate is treated without the delay which would be attendant in batch production and processing.

The most effective treatment for arresting the action of microbes in the permeate comprises pasteurization. Pasteurization generally comprises partial sterilization at a temperature and for a period of time that destroys objectionable organisms, without major chemical alteration of the product. To arrest the activity of the cheese-making bacteria in the permeate, particularly whey permeate, pasteurization may comprise heating the permeate to a temperature of at least about 110° F., more preferably at least about 120° F., most preferably about 145° F., and maintaining that temperature for at least about 30 minutes with constant stirring, for example, stirring with an agitator at 60 rpm. According to the so-called "holding method", the permeate may be heated to 145° F. and held at this temperature for 30 minutes with constant stirring with an agitator at 60 rpm. Alternatively, a high-temperature, short-time process ("batch pasteurization") may be employed. The latter requires a temperature of 162° F. for 16 seconds. Even shorter duration processes (278° F. for 4–6 seconds, or 285° F. for 2 seconds) may be employed, but are not preferred because of the added expense. Any combination of time and temperature may be utilized so long as it achieves adequate pasteurization of the whey permeate to result in the arrest of microbial growth. The result is an excellent dairy taste which is maintained under refrigeration for three weeks. A taste panel of five individuals found the taste of refrigerated whey permeate to be bland but pleasant, and not salty.

The dairy permeate is essentially free of casein and lactalglobulin, which are removed in the filtration process. Lactalbumin, which is not removed in the filtration process, is the most heat labile of all proteins. It is readily denatured even by pasteurization conditions. Hence, the permeate is substantially hypoallergenic, even if some lactalbumin remains therein.

The dairy permeate, from which greater than 99% of the milk protein has been removed, is also essentially free of any veterinary or agricultural chemicals since protein comprises the principal binding sites for these chemicals.

The permeate may be rendered even more hypoallergenic by heat treatment at 145–155° F. with constant stirring for 24–48 hours, preferably 36 hours. Thus further heat treatment may have the advantage of further denaturing or destroying secondary structures of food antigens. In particular, the heat treatment will denature any lactalbumin which may remain in the permeate, although trace portions of this heat labile protein which has been treated for 30 minutes at 145° F., for the minimum essentials of batch pasteurization, will not have an effect on most allergic individuals.

Although the permeate, appropriately treated to arrest microbial growth, may be utilized in liquid form to prepare the beverages described herein, it may also be dried to a powder and later reconstituted. If a dried permeate powder is desired, the drying should take place promptly after the treatment to arrest microbial growth. This obviates the need for refrigeration of the powder.

The liquid permeate may be dried to a moisture content of about 4 wt. % by spray drying employing, for example, a dryer inlet temperature of 400° F. and a dryer outlet temperature of 200° F., a drying time of four to five hours, a pressure of 2000–2500 psi, and a 68–70 gauge spray nozzle bore. Suitable spray dryers are available from, for example, Delfab (Delaware, Ohio). Suitable spray nozzles are available, for example, from Spray Drying Systems (Wheaton, Ill.).

Alternatively, the liquid permeate may be concentrated to about 45 wt. % moisture in a suitable evaporator device, such as the devices available from Weegan (Logan, Utah). In subsequent spray drying to 4% moisture, the spray nozzle gauge should be increased to 60–62 gauge, in order to handle the thicker consistency of the evaporated permeate. Preferably, about 0.25% soy-oat powder is added to the permeate to promote drying. Drying by a belt-dryer may be substituted for spray drying.

The dried powder may be optionally further heat treated at from about 145 to about 155° F., for from about 24 to about 48 hours, preferably about 36 hours.

The dried permeate powder may be reconstituted with water. Spring water or distilled water should be used to avoid the chlorine taste of tap water. The powder may be reconstituted by adding 95 wt. parts water to 5 wt. parts powder, for example.

To prepare a hypoallergenic milk product, the permeate (liquid or dried milk permeate or whey permeate) is supplemented with hypoallergenic protein and, optionally, fat, as set forth in U.S. Pat. Nos. 5,064,674 or 5,204,134, incorporated herein by reference. The hypoallergenic protein component may comprise hypoallergenic protein per se, such as protein from cereal or vegetable sources. Alternatively, or additionally, it may comprise free amino acids, or "short chain polypeptides" of animal source. By "short chain polypeptide" is meant a polypeptide having a molecular weight of not more than about 5 kDa, preferably not more than about 1.5 kDa, more preferable not more than about 1 kDa.

Sources of hypoallergenic protein include, but are not limited to: oat cereal (which has a high protein level of about 18%); rice cereal; barley cereal; or any other food source having a low allergenicity and ample protein content. Vegetable sources of protein may also be used, so long as they have a low allergenic potential. Vegetable sources of low allergenic protein include, for example, potato and soy isolate. Combinations of the foregoing proteins may also be used. Oat cereal, for example oatmeal, is preferred because it not only enhances the protein content, but also adds to the taste of the resulting product. The oat cereal is used as a very finely ground flour, to facilitate dissolution into the permeate. About 5 to 10 grams of the very finely ground and sieved cereal flour is added to about 100 cc of product. The resulting mixture has a protein content of about 0.9 to 1.8% by weight, which is similar to human breast milk.

When cereals are used, protein soy isolate may also be added to enrich the lysine amino acid value of the cereal. Additionally, the protein may be supplemented with, among other things, methionine, cystine, and iodine to meet the minimum daily requirements.

Protein soy isolate is preferred for use in hypoallergenic milk which is intended for infants who require a single source of protein, or children and adolescents with important growth factor requirements. Cereal hypoallergenic protein sources can be used in the hypoallergenic milk for adults. For example, if a multiple source of protein is desired, any combination of hypoallergenic protein sources may be used.

In lieu of, or in addition to, supplementation with hypoallergenic protein, the product may be supplemented with amino acids, short chain polypeptides, or a combination thereof. Free amino acids and short chain polypeptides are hypoallergenic regardless of source, and therefore will not contribute to the allergenicity of the milk product. Preferably, the amino acids comprise a mixture of amino acids, most preferably a mixture containing at least the nine amino acids which are essential to the human diet:

| | | |
|---|---|---|
| Threonine | Valine | Phenylalanine |
| Methionine | Isoleucine | Histidine |
| Lysine | Leucine | Tryptopan |

The short chain polypeptides may comprise individual polypeptides or a mixture of polypeptides. The short chain polypeptides and amino acids may be obtained by appropriate hydrolysis of any suitable polypeptides or proteins. Preferably, they are obtained from milk proteins, so that the reconstituted hypoallergenic milk product of the invention maintains a portion of the protein nutritional content of whole milk. Hydrolysates of milk proteins are commercially available, a highly hydrolyzed pancreatic digestive of casein. A hydrolyzed pancreatic digest of another milk protein, lactalbumin, may be utilized. High-performance liquid chromatography indicates that these products are free of polypeptides having a molecular weight of greater than about 1.5 kDa. Hydrolysates of non-milk proteins may also be employed, e.g., a papaic digest of soy flour.

The sources of the optional fat component may include deproteinized clear butter and butter oil or butter fat, polyunsaturated and mono-and/or polyunsaturated vegetable oil or fat from milk free margarine sources, sesame, safflower, and the like, or mixtures thereof. The foregoing fats are hypoallergenic.

Deproteinized hypoallergenic butter for supplementing the permeate may be made from commercially available salt-free, sweet 99.99% anhydrous milk fat. The milk fat is melted in boiling water. The resulting butter oil is then removed from the boiling water, such as by pipetting it off the surface of the water. The boiling water results in extreme heat denaturation of protein and also renders the resulting heat-denatured protein insoluble. The process removes, by dilution and washing of the milk fat with water, any protein which may be contained in the fat as a contaminant. The process may be repeated any number of times to ensure the purity of the resulting butter product. Vitamin E may be added to prevent oxidation.

The deproteinized hypoallergenic butter advantageously includes vitamin E as an antioxidant.

Vitamins, and further minerals in addition to whose present in the permeate, are also optionally added to the protein and fat-supplemented permeate. Such vitamins and minerals are added, so that the resulting milk products meet the minimum daily requirement.

Whey permeate appropriately flavored with one or more flavoring agents, may be used as an electrolyte beverage. Pasteurized whey permeate will generally have a potassium concentration of about 37 mEq/L. While a such a high potassium level is tolerated by most individuals, it may be desirable to reduce the potassium level by diluting the permeate before use in formulating beverages, particularly electrolyte beverages. High potassium concentrations might be harmful to individuals suffering from kidney or cardiac disfunction, and may be undesirable even for normal individuals after extreme exercise. Thus, it may be advisable, particularly in the preparation of electrolyte beverages for consumption by patients with kidney function impairment, to reduce the potassium level of the permeate to about 30 mEq/L or lower, more preferably to about 25 mEq/L, or even lower. The diluent most advantageously comprises water. For use in compositions designed to be taken following extreme exercise, the permeate should be diluted about 1:10 or more, to provide a potassium concentration of no more than about 5 mEq/L, preferably no more than about 4 mEq/L, ideally no more than about 3 mEq/L.

Whey permeate which has been diluted with water, e.g., 2:1, to adjust the potassium concentration to a level appropriate for electrolyte therapy for fluid loss, is somewhat low in sodium. Whey permeate contains about 15 mEq/L sodium. Thus, it is appropriate to boost the sodium concentration of the whey permeate by adding sodium, such as in the form of sodium chloride and/or sodium citrate, particularly when the permeate is used as an electrolyte beverage. Other sodium salts may be substituted. The sodium concentration of the beverage is preferably boosted in this manner to at least about 45 mEq/L.

The approximate concentrations of other minerals in the whey permeate are as follows: calcium, 10 mEq/L; magnesium, 5 mEq/L; and phosphorus, 7 mEq/L.

The dairy permeate contains substantial amounts of carbohydrate, in the form of the disaccharide lactose. The enzyme lactase ($\beta$-galactosidase) may be added to the beverage to break down lactose, in order to avert problems with consumption by lactose-intolerant individuals, and to promptly provide monosaccharides not dependent on disaccharide digestion. Approximately 15% of the population over the age of six years has been estimated to suffer from lactase deficiency. The amount of lactase added should be sufficient to substantially hydrolyze the lactose contained in the permeate into its component monosaccharides, galactose and glucose. The glucose contributes to the sweetening of the permeate.

Further dilutions and mineral adjustments may be incorporated as necessary to obtain a permeate product which is isotonic or isomolar with respect to the osmolarity of blood (300 milliosmoles/L).

Whey permeate is flavored with one or more flavoring agents for use as an electrolyte beverage. The flavoring agent may comprise virtually any agent suitable for flavoring beverages, compatible with the use of the beverage as an electrolyte replacement drink. The flavoring agent may advantageously comprise, for example, any of the following fruit flavors, derived from fruit concentrates of low allergic potential: lemon, lime, grapefruit, banana, pear, hypoallergenic chocolate, low-acid orange and blends thereof. Low-acid orange has been observed to be hypoallergenic. Pear is preferably heat-treated to further enhance hypoallergenicity. Vanilla, oat, and rice are other suitable flavors. Such flavoring agents are commercially available. The amount of flavoring agent added to the pasteurized permeate depends upon the strength of the particular agent and the desired taste. Typically, the beverage may comprise about 5 wt. % flavoring agent.

The resulting electrolyte beverage may be taken as a sports drink after vigorous exercise, to replace sweat. The beverage may also be used as a therapeutic drink, to replace gastrointestinal fluid and electrolytes lost from vomiting or diarrhoea caused by gastroenteritis.

The electrolyte beverage may also be used as an "elemental" feeding, with the inclusion of appropriate additional ingredients, such as amino acids. Elemental feeding compositions will generally contain simple sugars such as glucose, amino acids and electrolytes. Such a feeding composition may be used for providing nourishment to post-operative patients, particularly post-operative bowel surgery patients. It also finds use in administering nourishment to patients suffering from bowel disorders or diseases, such as chronic ileitis or colitis. Amino acids may also be added in the case of a sports exercise drink, to stimulate the restoration of muscle tissue which may be lost through vigorous exercise.

When added to the electrolyte beverage, amino acids are present in the range of, for example, from about 0.5 to about 2.0 wt. %. Preferably, a mixture of amino acids is employed which contains no more than about 0.25% protein, preferably no more than about 0.1%, most preferably no more than about 0.025%.

Although derived from a milk product, i.e., milk or whey, the dairy permeate is substantially milk protein-free. The dairy permeate contains no more than about 0.25 wt %, more preferably no more than about 0.1 wt %, most preferably no more than about 0.025 wt %, milk protein. Thus, beverages utilizing the permeate may be enjoyed by mildly or moderately milk-allergic individuals.

To form a chocolate-flavored drink, the dairy permeate, and the whey permeate in particular, may be flavored with a cocoa powder. To maintain the reduced allergenicity of the product, only hypoallergenic chocolate flavorings are recommended, such as the heat-treated cocoa powder described in U.S. Pat. No. 4,078,093. As described therein, a hypoallergenic cocoa powder is prepared by heating ground nibs of cocoa beans at high temperature and pressure. Alternatively, the whey permeate may be flavored with the complete hypoallergenic chocolate described in U.S. Pat. No. 4,078,093, which is prepared by mixing the cocoa powder with sugar, cocoa butter and flavoring additives, followed by further heat treatment to produce a hypoallergenic chocolate.

Alternatively, the chocolate flavoring agent may comprise defatted cocoa. It has been unexpectedly found that in defatting cocoa to obtain a substantially completely fat-free cocoa powder (>99% fat-free), such as by defatting with a supercritical fluid, e.g., $CO_2$, the resulting powder is rendered hypoallergenic, without the need for heat denaturation of protein allergens as described in U.S. Pat. No. 4,078,093.

At supercritical conditions, $CO_2$ exhibits the properties of both a gas and a liquid, and is thus used as a solvent, without leaving a toxic residue. $CO_2$ is preferred as the supercritical fluid since other defatting solvents, most notably hexane, may leave a residue which can cause an adverse reaction in allergic and asthmatic patients.

Without wishing to be bound by any theory, it is believed that removal of the fat from cocoa powder may impact on the three-dimensional structure of the protein component of cocoa, such that the human immune system will no longer recognize the proteins contained therein as allergens. Defatting also results in removal of mold, which may contribute to allergenicity.

The fat-free cocoa powder described herein may be distinguished from the heat-treated cocoa powder of U.S. Pat. No. 4,078,093. The latter contains substantial amounts of fat, at least 8%. The defatted hypoallergenic cocoa powder is used as a flavoring for the whey permeate.

The defatting process results in the elimination of mold, since the coating of microscopic mold spores comprises fat. Removal of yeast mold allows the cocoa powder to be utilized in soft drink plants, where the presence of mold is highly undesirable. Moreover, many patients allergic to chocolate are also allergic to other mold-containing foods, such as wine and cheese. It is believed that removal of the mold may contribute to the reduced allergenicity of the fat-free cocoa powder.

Essentially fat-free (>99% fat-free, more preferably at least 99.95% fat-free) cocoa powder may be prepared by defatting treatment of cocoa powder with supercritical $CO_2$. It may be prepared according to the process of U.S. Pat. No. 3,923,847. Cocoa powder is contacted with carbon dioxide which has been brought to supercritical conditions in respect to temperature and pressure. Pressures above 75.3 atmospheres, which is approximately equal to the $CO_2$ critical pressure, and temperatures above the $CO_2$ critical temperature (31.6° C.), are necessary for fat extraction. In practice, a pressure above 100 atmospheres gauge, and preferably between 200 and 400 atmospheres gauge, may be used. It is only necessary to work slightly above the critical temperature of $CO_2$. Preferably, the temperature is in the range of from about 40° C. to about 60° C. The contact time may generally comprise from about 2 to about 10 hours, with 4–5 hours being preferred.

The dairy permeate product may be stored in dry powder form and reconstituted with filtered water or soda as a sports exercise or electrolyte replacement beverage. Per unit of dry weight the product contains no fat, compared to 5.4% fat in skim milk and up to 38.3% fat in whole milk, based upon dry weight.

The practice of the invention is illustrated in the following non-limiting examples.

EXAMPLE 1

Whey diluted 20% with spring water was filtered through a tubular spiral wound membrane ultrafilter (0.01μ pore size). The permeate (pH 6.6) was immediately batch pasteurized at 145° F. for 30 minutes, followed by refrigeration. Reexamination of the pH and titratable acid revealed no decrease in pH or increase in acid after 7 days of refrigeration.

EXAMPLE 2

Several six-ounce glasses of the refrigerated permeate of Example 1 were flavored with 12 ml (corresponding to 5%) of one of the following flavor concentrates: banana, hypoallergenic low acid orange, hypoallergenic chocolate flavor, or tropical fruit. In another experiment, 30 ml of non-concentrated pear nectar was added to 70 ml of refrigerated permeate. A taste panel found all these products to be pleasant tasting, very palatable, bland and not salty.

EXAMPLE XXa

The liquid permeate of Example 1 was dried to a moisture content of about 4 wt % by spray-drying, employing a dryer inlet temperature of 400° F. and a dryer outlet temperature of 200° F., with a drying time of 4 hours, at a pressure of 2500 psi, and a 68 gauge spray nozzle bore. Two 50 lb samples of dried permeate were produced in this manner. The dried permeate was then reconstituted to its native liquid form by combining 6.2 weight parts of powder with 93.8 weight parts of water.

EXAMPLE 4

The powdered permeate of Example 3 was reconstituted in flavored soda by adding 3 weight parts of flavored soda to 7 weight parts of powdered permeate.

EXAMPLES 5 TO 6

To 100 ml of the reconstituted liquid permeate and permeate-soda of Examples 3 and 4 was added one drop of lactase. The samples were stored for 24 hours in a refrigerator to permit the lactase to act on lactose in the samples, resulting in the production of the monosaccharides glucose and galactose which sweetened the product.

EXAMPLE 7

Seventy ml of the reconstituted liquid permeate prepared according to Example 3 is diluted with 30 ml water to achieve a potassium level of about 25 mEq/L. To the 100 ml sample is then added the following: 2 mEq NaCl and 1 mEq sodium citrate. This increases the sodium level of the sample to 45 mEq/L from the estimated natural level of 15 mEq/L, and increases the citrate level to 29 mEq/L from the estimated natural level of 19 mEq/L. The addition of the NaCl also increases the chloride level from 18 to 38 mEq/L. Upon addition of flavoring, the product may be used as an electrolyte beverage to replace fluid or electrolytes lost from diarrhea.

EXAMPLE 7a

To the electrolyte beverage of Example 7 was added 3.5% finely milled and sifted rice flour to augment the taste of the electrolyte solution.

EXAMPLE 7b 1 gram of essentially fat-free (less than 1 wt % fat) cocoa powder (prepared by supercritical $CO_2$ treatment of cocoa powder) was added to 100 ml of the beverage prepared according to Example 7 to form an electrolyte fluid replacement liquid drink. One drop of lactase enzyme was then added to convert the lactose to component monosaccharides.

EXAMPLE 8

1 gram of essentially fat-free (less than 1 wt % fat) cocoa powder (prepared by supercritical $CO_2$ treatment of cocoa powder) was added to 100 ml of liquid permeate prepared in accordance with Example 1, diluted 90% with water to achieve a potassium level of 3 mEq/L. One hundred mg of NaCl was then added to achieve a sodium level of 19 mEq/L and a chloride level of 20 mEq/L. Fructose was added in the amount of 4.5 g to bring the carbohydrate level to 5%. The result was a chocolate-flavored electrolyte fluid replacement drink also useful as a sports drink.

EXAMPLE 8a

One gram of essentially fat-free (less than 1 wt % fat) cocoa powder prepared by supercritical $CO_2$ treatment of cocoa powder was added to the beverage of Example 8, along with 2% finely milled and sifted rice flour to augment the taste of the sports exercise drink.

EXAMPLE 8b

To 100 ml of the exercise drink of Example 8a was added 1 drop of lactase enzyme preparation, followed by refrigeration for 24 hours to convert the lactose to its component monosaccharides, namely, glucose and galactose. The conversion of lactose augmented the taste of the beverage.

EXAMPLE 9

A hypoallergenic milk product was prepared as follows. To 250 ml of the liquid permeate prepared according to Example 1 was added 3.5% oat soy powder, 0.5% deproteinized anhydrous oil rendered hypoallergenic in accordance with U.S. Pat. No. 5,112,636, 0.05% vitamin E as an antioxidant and 1.8% finely milled and sifted rice flour.

EXAMPLE 9a

The procedure of Example 9 was repeated except that the amounts of finely milled and sifted rice flour was increased to 3.5%, and 1% supercritical $CO_2$-defatted chocolate flavor was added.

EXAMPLE 10

0.62 grams of dried whey permeate was added to 50 ml of diet non-phosphate cream soda and 50 ml of non-phosphate cream soda to achieve a fructose concentration (fructose is the carbohydrate in the soda) to 6.0%. To this was added 100 mg of NaCl to achieve a sodium ion concentration of 19 mEq/L (45 mg %) and a chloride level of 20 mEq/L. The beverage is useful as a sports exercise drink.

EXAMPLE 10a

One gram of essentially fat-free (less than 1 wt % fat) cocoa powder prepared by supercritical $CO_2$ treatment of cocoa powder was added to the beverage of Example 10, along with 2% finely milled and sifted rice flour to ougment the taste of the exercise drink. The beverage is also an instant soda fountain drink.

EXAMPLE 10b

To 100 ml of the exercise drink of Example 10a was added 1 drop of lactase enzyme preparation, followed by refrigeration for 24 hours to convert the lactose to its component monosaccharides, namely, glucose and galactose. The conversion of lactose augmented the taste of the beverage.

EXAMPLE 11

Example 10 was repeated, deleting the 50 ml of diet soda and increasing the amount of non-diet soda to 100 ml, to achieve a pleasantly flavored hypoallergenic sports exercise dring beverage having a carbohydrate content of 11%.

EXAMPLE 11a

To 100 ml of the beverage of Example 11 was added 1 gram of essentially fat-free (less than 1 wt % fat) cocoa powder prepared by supercritical $CO_2$ treatment of cocoa powder. Also added was 2% of finely milled and sifted rice flour to augment the taste of the beverage.

EXAMPLE 12

An elemental sports exercise drink is prepared as follows. To the composition of Example 10b is added 0.5% of an amino acid mixture containing less than 0.25% protein, preferably less than 0.025% protein.

EXAMPLE 13

An electrolyte replacement beverage is prepared by adding to the composition of Example 7 0.5% of an amino acid mixture containing less than 0.25% protein, preferably less than 0.025% protein.

All references cited with respect to synthetic, preparative and analytical procedures are incorporated herein by reference.

The present invention may be embodied in other specific forms without departing from the spirit or essential attributes thereof and, accordingly, reference should be made to the appended claims, rather than to the foregoing specification, as indication of the scope of the invention.

I claim:

1. A process for preparing an electrolyte beverage comprising:
    filtering whey to form a whey permeate;
    collecting the whey permeate and pasteurizing the whey permeate to arrest microbial activity before the pH of the permeate has dropped more than about 0.3 pH units from the pH at the time of permeate collection; and
    optionally flavoring the permeate with one or more flavoring agents.

2. The process of claim 1 wherein the pasteurization occurs no more than about 15 minutes following collection of the permeate.

3. The process of claim 2 wherein the pasteurization occurs immediately upon collection of the permeate.

4. A process according to claim 1 comprising:

filtering whey to form a whey permeate;

collecting the whey permeate and pasteurizing the whey permeate to arrest microbial activity before the pH of the permeate has dropped more than about 0.3 pH units from the pH at the time of permeate collection; and flavoring the permeate with one or more flavoring agents.

5. A process according to claim 4 wherein the whey permeate is continuously collected and the continuously collected permeate is continuously treated to arrest microbial activity.

6. A process according to claim 4 wherein the whey is filtered through a filter or membrane having a molecular size exclusion of at least as low as about 20 kDa.

7. A process according to claim 6 wherein the filter or membrane has a molecular size exclusion of at least as low as about 10 kDa.

8. A process according to claim 4 wherein the milk protein content of the whey permeate is no more than about 0.25 wt. %.

9. A process according to claim 8 wherein the milk protein content of the whey permeate is no more than about 0.1 wt. %.

10. A process according to claim 9 wherein the milk protein content of the whey permeate is no more than about 0.025 wt. %.

11. A process according to claim 4 wherein the step of pasteurizing the whey permeate to arrest microbial activity comprises heating the permeate to a temperature of at least about 110° F., and maintaining that temperature for at least about 30 minutes.

12. A process according to claim 11 wherein the step of pasteurizing the whey permeate to arrest microbial activity comprises heating the permeate to a temperature of at least about 145° F., and maintaining that temperature for at least about 30 minutes.

13. A process according to claim 4 wherein the pasteurization occurs no more than about 15 minutes following collection of the permeate.

14. A process according to claim 4 comprising adding sodium to achieve a sodium concentration in the beverage of at least about 45 mEq/L.

15. A process for preparing an electrolyte beverage comprising:

collecting a whey permeate;

heating the permeate to a temperature sufficient to arrest microbial activity in the permeate before such time as the pH of the permeate has decreased no more than about 0.3 pH units following collection, due to microbial activity in the permeate;

flavoring the permeate with one or more flavoring agents.

16. A process for preparing a substantially hypoallergenic milk product comprising (a) filtering milk or whey to form a dairy permeate containing no more than about 0.25 wt % milk protein;

(b) collecting the dairy permeate and pasteurizing the dairy permeate to arrest microbial activity before the pH of the permeate has dropped more than about 0.3 pH units from the pH at the time of permeate collection; and (c) adding a hypoallergenic protein component.

17. A process according to claim 16 wherein the hypoallergenic protein component is selected from the group consisting of hypoallergenic protein, amino acids, short-chain polypeptides, and combinations thereof.

18. A process according to claim 17 further comprising adding a hypoallergenic fat component.

19. A process according to claim 18 wherein the hypoallergenic fat component is selected from the group consisting of deproteinized butter, vegetable oil, and combinations thereof.

20. A process according to claim 16 wherein the step of pasteurizing the permeate to arrest microbial activity comprises heating the permeate to a temperature of at least about 110° C., and maintaining that temperature for at least about 30 minutes.

21. A process according to claim 16 wherein the pasteurization occurs no more than about 15 minutes following collection of the permeate.

22. A process according to claim 16 wherein the milk or whey is filtered through a filter or membrane which has been primed for at least about fifteen minutes by passage of milk or whey therethrough, before collecting any of said permeate.

23. A process according to claim 21 wherein the dairy permeate is pasteurized immediately upon collection.

* * * * *